United States Patent
Hunt, Jr. et al.

(10) Patent No.: US 11,718,459 B1
(45) Date of Patent: Aug. 8, 2023

(54) FLAT INTERLOCKING WRAP FOR COMPLEX SHAPES

(71) Applicant: TredWear LLC, Shelby, AL (US)

(72) Inventors: Michael Steven Hunt, Jr., Columbiana, AL (US); Lee James Clayton, Columbiana, AL (US)

(73) Assignee: TredWear LLC, Shelby, AL (US)

( * ) Notice: Subject to any disclaimer, the term of this patent is extended or adjusted under 35 U.S.C. 154(b) by 0 days.

(21) Appl. No.: 17/010,623

(22) Filed: Sep. 2, 2020

Related U.S. Application Data

(60) Provisional application No. 62/922,856, filed on Sep. 3, 2019.

(51) Int. Cl.
| | |
|---|---|
| *B65D 65/06* | (2006.01) |
| *B25G 1/10* | (2006.01) |
| *B62K 21/26* | (2006.01) |
| *A63B 60/14* | (2015.01) |

(52) U.S. Cl.
CPC .............. *B65D 65/06* (2013.01); *B25G 1/10* (2013.01); *A63B 60/14* (2015.10); *B62K 21/26* (2013.01)

(58) Field of Classification Search
CPC ........... D04D 9/04; A63B 60/14; B65D 65/06; B65G 1/10
See application file for complete search history.

(56) References Cited

U.S. PATENT DOCUMENTS

| | | | | |
|---|---|---|---|---|
| 2,371,566 | A * | 3/1945 | Williams | B42B 5/106 156/271 |
| 2,659,605 | A | 11/1953 | Tourneau | |
| 3,851,353 | A * | 12/1974 | Wakeman | E05D 1/00 428/33 |
| 3,925,136 | A * | 12/1975 | Wakeman | F16G 3/10 156/263 |
| 4,780,346 | A * | 10/1988 | Denoel | B29C 70/222 428/176 |
| 5,325,737 | A * | 7/1994 | Bendetti | G05G 1/06 74/551.9 |
| 5,867,868 | A * | 2/1999 | Ward | A63B 60/10 294/171 |
| 5,925,436 | A * | 7/1999 | Voss | B05B 12/28 428/156 |
| 6,267,836 | B1 * | 7/2001 | Fenske et al. | A61F 13/60 156/270 |
| 6,641,910 | B1 * | 11/2003 | Bries et al. | C09J 7/403 428/56 |
| 6,932,727 | B2 | 8/2005 | Kramer | |
| 8,020,262 | B2 * | 9/2011 | Oertel | A61F 13/625 24/442 |
| 9,463,569 | B1 * | 10/2016 | Douglas | B25G 1/102 |

(Continued)

*Primary Examiner* — Kevin R Kruer
(74) *Attorney, Agent, or Firm* — Harness, Dickey & Pierce, P.L.C.

(57) ABSTRACT

An interlocking wrap for covering an outer surface of an object provides desirable qualities to complex tube shapes using a flat piece of material. The wrap may cover tubes, handles, rods, or hoops, in their many examples. Existing adhesive technologies applied to the back of the material, combined with the formation of the material into a series of three or more offset tabs that interlock when folded together in the prescribed alternating order at their meeting points, creates a cover that is pleasing to the eye, protective, and durable to frictional use. The tabs overlap one over the next in similar fashion to a zipper or a braid, only leaving the bottom tab exposed to use.

10 Claims, 4 Drawing Sheets

Various Shapes can be Employed for the Interlocking Tabs

(56) References Cited

U.S. PATENT DOCUMENTS

| | | | |
|---|---|---|---|
| 9,630,077 B2 | 4/2017 | Mikura et al. | |
| D818,550 S | 5/2018 | Griffin, IV | |
| 10,286,269 B2 | 5/2019 | Inoue et al. | |
| 11,192,006 B2* | 12/2021 | Takeuchi | A63B 60/24 |
| 2007/0184736 A1* | 8/2007 | Seitz et al. | C09J 7/22 |
| | | | 442/151 |
| 2008/0228219 A1* | 9/2008 | Weiser | A61B 17/085 |
| | | | 606/215 |
| 2011/0289812 A1* | 12/2011 | Losinger | F41C 23/10 |
| | | | 42/72 |
| 2012/0279635 A1* | 11/2012 | Masson et al. | B29C 70/222 |
| | | | 156/149 |
| 2016/0069486 A1* | 3/2016 | Roberts et al. | F16L 57/02 |
| | | | 264/285 |
| 2019/0269214 A1* | 9/2019 | Hunt | A45C 13/103 |
| 2020/0095477 A1* | 3/2020 | Watzke et al. | C09J 7/401 |
| 2020/0139643 A1* | 5/2020 | Ogale | B29C 53/60 |
| 2020/0381145 A1* | 12/2020 | Vuylsteke | H01B 7/0869 |

\* cited by examiner

FLAT INTERLOCKING WRAP FOR COMPLEX SHAPES

FIELD OF THE INVENTION

The present invention relates to the skilled wrapping of complex shapes such as, tubes (square, hexagonal, trilobal etc.), handles, hoops, with a flat, flexible material. More specifically, this pertains to the wrapping of the grip areas of sporting goods, weapons, steering wheels, or tools.

DESCRIPTION OF THE RELATED ART

It has long been common to wrap handles or tubes with a long piece of tape, overlapping the ringlets round and round as the surface is covered. The user must wrap very carefully, making sure the overlap is consistent. User error makes it impossible to obtain a perfect result. In some cases, the long length required to cover a given space is unwieldy to control in tight spaces where the entire length must be wrapped around and threaded through, until exhausted. Additionally, manufacturing the long lengths of tape required to wrap a given surface restricts the type of material that can be used.

Another method of covering rods, handles or tubes, has been to wrap a flexible material around and lace it on, making holes all down the edges and using needle and thread. This solves the problems with tape but the lacing process is very time consuming and is difficult for users with low dexterity or lack of tools.

Another method of covering complex cylinders or shapes has been to dip them in a rubberized liquid. This works for items that are small and portable, but it does not work for items that are large or attached, such as a handrail. Some items are sensitive to liquid like a leather steering wheel. Also, the rubberized dip is not easily removable. Often, it must be cut away for removal, which would damage some objects.

Another method of covering complex cylinders or shapes has been to mold a specific shaped part out of one piece of material; (plastic, rubber or similar). Then the grip has to be fastened into place with adhesive or stretched into place using the material friction to affix. These can be difficult to install and they can only be installed on a rod or tool which has a free end not covered with a knob or attached to a larger part. This method is also restrictive, as it requires a part be made for each application. This method is also restricted to the use of base materials which can be melted and processed through the injection molding process.

PURPOSES FOR THIS INVENTION

It is desired to have a wrap that possesses the unique characteristics of covering complex shapes such as handles, rods, tubes, or hoops, with a piece of flat, flexible material, leaving no undesirable gaps or overlapping at its meeting points.

It is further desired that the cover be easy to install, requiring no special skills or tools.

It is further desired to have the wrap braid together at its meeting points, eliminating loose ends that could peel away due to frictional use. More specifically, that the wrap does not rely only on adhesive to stay affixed, but that the overlapping design of the tabs at the meeting point provide an additional layer of mechanical advantage to the wrap.

It is further desired to have a cover that can wrap not just a straight rod or tube, but can be used to cover a hoop or similar object containing compound curves.

It is further desired to manufacture the cover with a flat piece of flexible material not much larger than the object it is covering.

It is further desired that the cover could wrap the object in a repeating pattern exhibiting skill, that is consistent, and pleasing to the eye, without requiring tedious attention, or specific skills to the art of wrapping or braiding.

It is further desirable to have a cover that is easy to remove without damaging the object to which it is attached.

It is further desired to use the technology to have many flexible material options, providing the unique benefits of each for example: Rubber adds additional grip for secure handling in low friction situations. Leather adds a pleasing sense of touch. Vinyl adds protection from elements etc.

Thus there exists a need for an invention that solves these and other problems.

SUMMARY OF THE INVENTION

The present invention relates to adhering a wrap to complex shapes such as, tubes (square, hexagonal, multi-planar), handles, hoops with flat, flexible, material, which is easy to install, requiring no special skills or tools, eliminating undesirable loose ends at its' meeting point.

In the following description, numerous specific details and options of the present invention are set forth in order to provide a more thorough understanding of the present invention. It will be appreciated, however, by one skilled in the art, that the present invention may be practiced without such specific details or optional components, and that such descriptions are merely for convenience, and as such solely selected for the purpose of illustrating the invention. Reference to the drawings showing embodiments of the present invention are made to describe the invention and do not limit the scope of the disclosure herein.

DETAILED DESCRIPTION

According to one embodiment of the present invention, a flat, flexible material can be cut using the proposed design, to transfer the desirable qualities of the given material to the object onto which it is applied. In particular, the invention allows the user to apply the desirable material qualities to the outside of complex tube shapes using a simple flat piece of material. Specifically, this applies to wrapping tubes, handles, rods, or hoops, in their many examples. The goal is to wrap these objects, applying the desired flexible material, without leaving loose ends to peel away.

Figure 1:
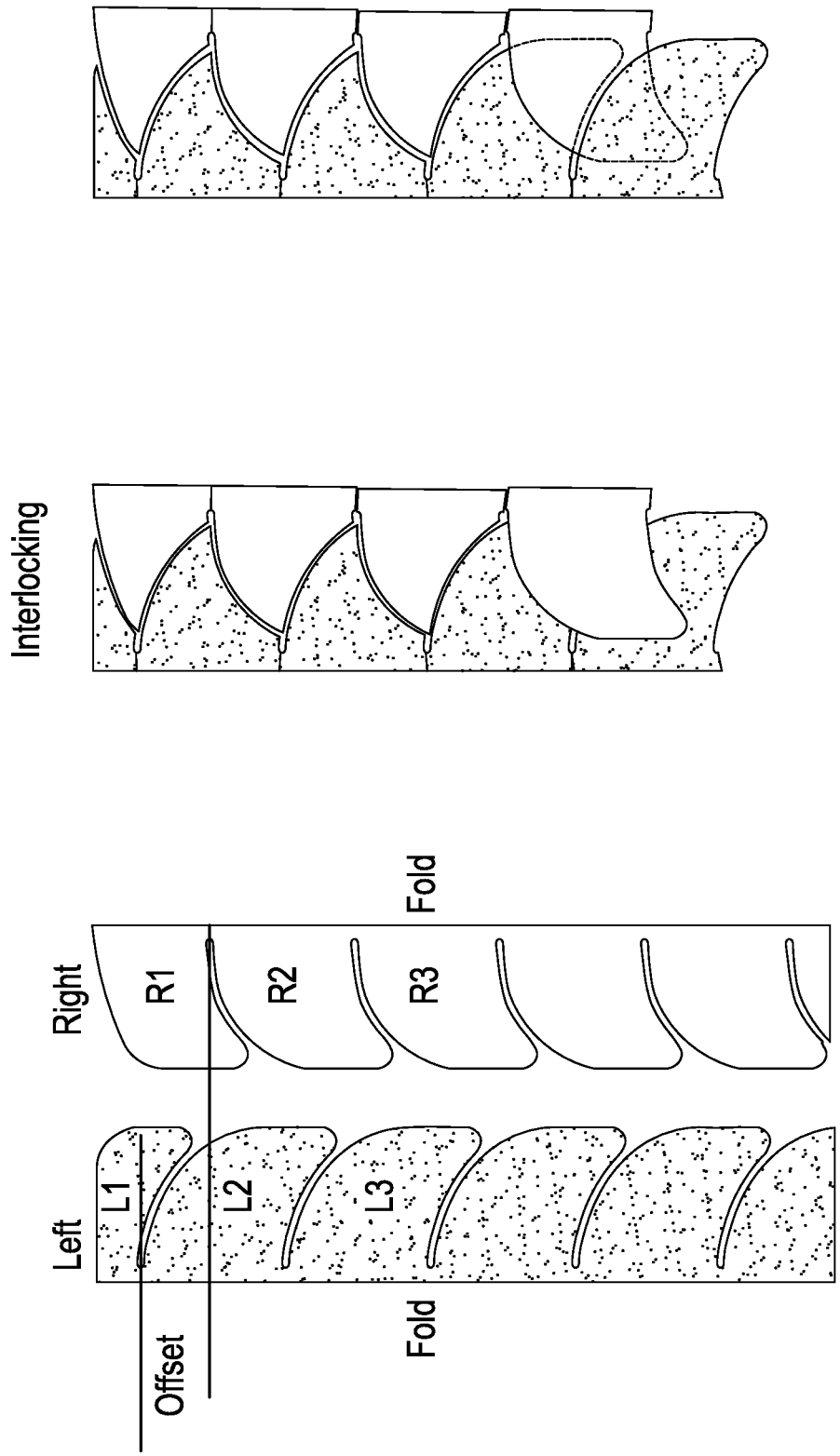
FIG. 1 depicts a wrap with tabs of the wrap spaced apart from one another when the wrap is in a free state as well as tabs interlocking and at least partially overlapping one another when the wrap is in a mounted state.

According to another advantage of the present invention, the invention is durable in response to friction use. The invention combines existing adhesive technologies common to those familiar with the art of adhesives, with the formation of the material into a series of offset tabs that interlock when folded in the prescribed, alternating order at their meeting points. The tab lengths may vary depending upon the diameter of the object to be wrapped. However, the relation of the tabs to each other remains consistent so that they overlap without leaving any loose ends that may be peeled away with use. The invention allows the user to fold the tabs in similar fashion to a zipper only leaving the bottom tab exposed to use. (See FIG. 1)

The shape and length of the tabs can be infinite in variation. The invention's design employs arrangement of the tabs in a specific offset and length to each other, prescribed by the shape and size of the object for which the wrap was created. This allows them to be braided together around the object with the aforementioned advantage. (See FIG. 2)

Figure 2:
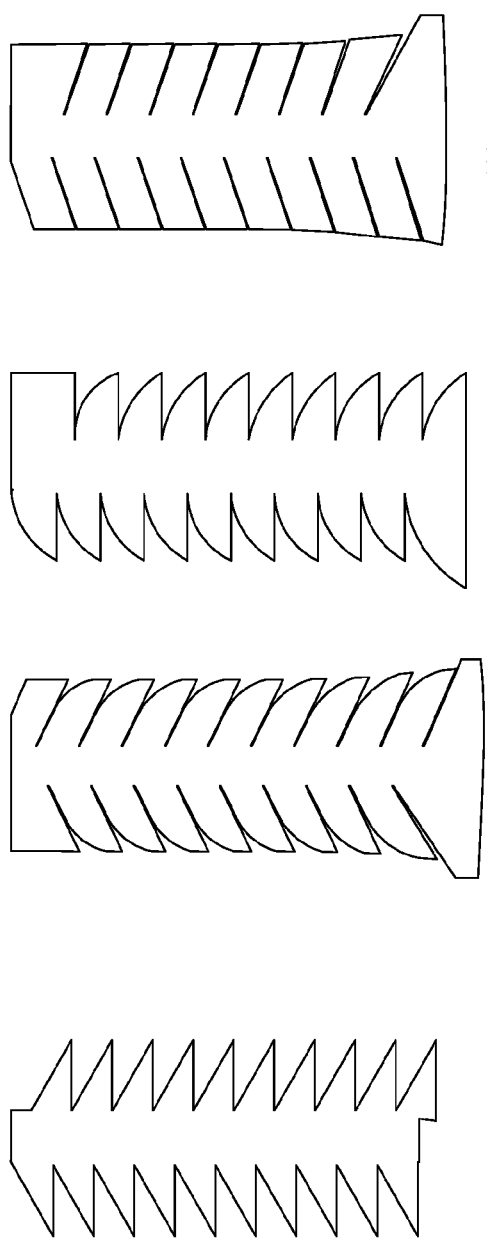
FIG. 2 depicts various shapes of the wrap.
Figure 2:
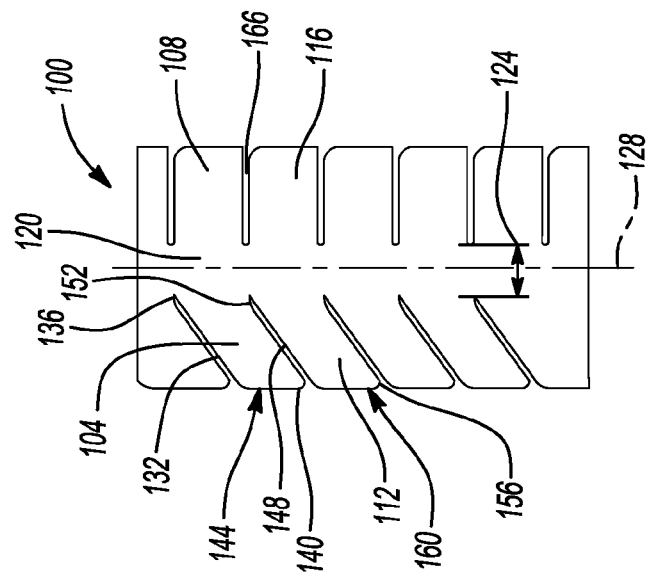
Figure 2:
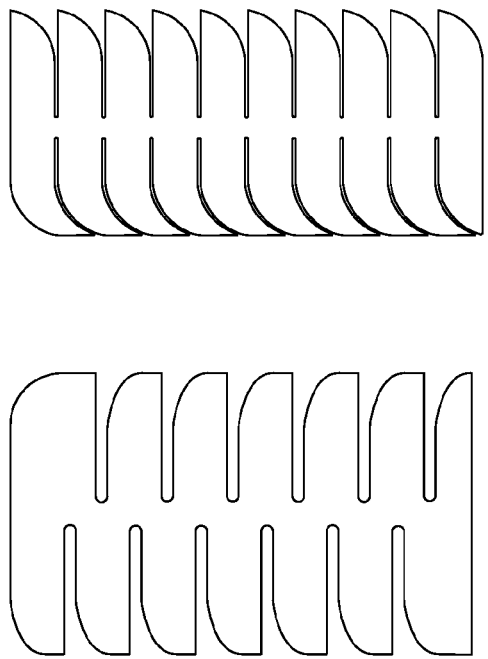

FIG. 2 depicts an embodiment of a wrap at reference numeral 100. Wrap 100 includes a first tab 104, a second tab 108, a third tab 112, and a fourth tab 116. First tab 104 and third tab 112 extend laterally outwardly from a spine 120 having a width 124. Spine 120 has a longitudinally extending linear central axis 128. First tab 104 and third tab 112 extend from spine 120 in a first laterally outward direction. First tab 104 includes a first edge 132 extending a non-right angle relative to central axis 128. First edge 132 includes a first end 136 intersecting spine 120 and an opposite second end 140 positioned at a distal end 144 of first tab 104.

Third tab 112 includes a first edge 148 having a first end 152 intersecting spine 120 and an opposite second end 156 positioned at a distal end 160 of third tab of 112. At least a portion of first edge 148 of third tab 112 extends at a non-right angle relative to central axis 128.

Second tab 108 and fourth tab 116 extend from spine 120 in a second laterally outward direction relative to central axis 128. Second tab 108 and fourth tab 116 are longitudinally spaced apart from one another having a gap 166 therebetween. Distal end 144 of first tab 104 is longitudinally offset from the second and fourth tabs 108, 116 such that distal end 144 of first tab 104 is transversally aligned with gap 166.

According to another embodiment of the present invention, adhesive can be added to affix the invention to the desired object. Effective strengthening is achieved by the combination of adhesive and the interlocking design. A self-adhesive backing applied by the manufacturer to the base material before processing is most desirable. Conversely, the material can contain its own self-adhesive properties such as uncured rubber, or external adhesive can be applied secondarily by the user. Factory affixed adhesives include but are not exclusive to; gum rubber, acrylic adhesives, or water based adhesives. If no external adhesive is employed, or for additional strength, the invention can be affixed with a self-adhesive tape band around the last loose tab.

Figure 3:
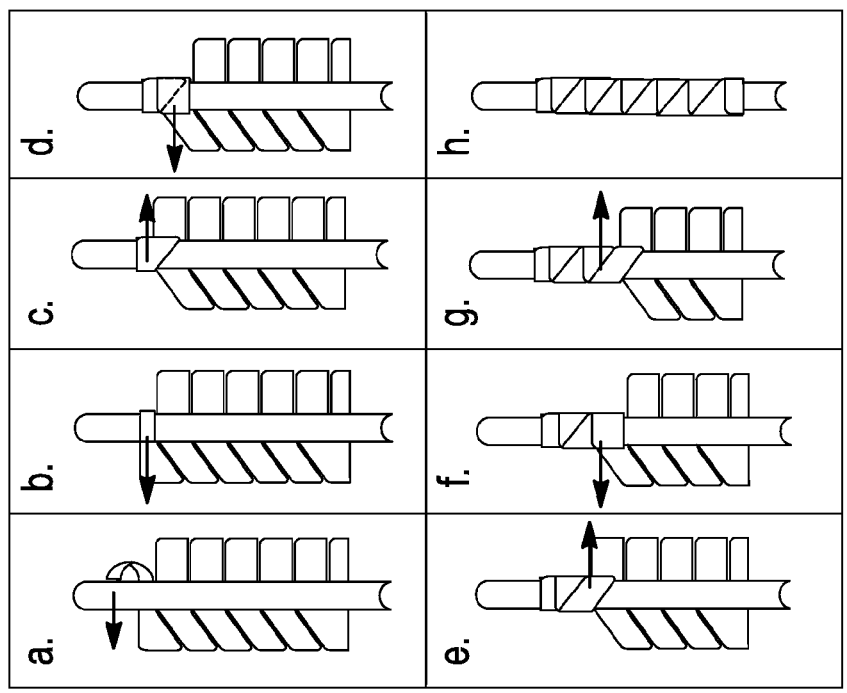
FIG. 3 depicts several stages during installation of the wrap.

According to another advantage of the present invention, the invention is easy to install, without special tools or skills. Installation is to be achieved by peeling the adhesive backer off the material, leaving the adhesive exposed. Next, the spine of the invention is placed longitudinally against the object to be covered. Then, starting at the top, the user folds the first short tab, followed by the tab on the opposite side, in a crisscross, alternating pattern until the complete grip is laced, or braided into place. Each tab is locked in by the one below leaving no loose ends to fail. The adhesive, in concert with the overlapping tabs makes for a desirable cover, which is resistant to failure with frictional use. (See FIG. 3)

Figure 4A:
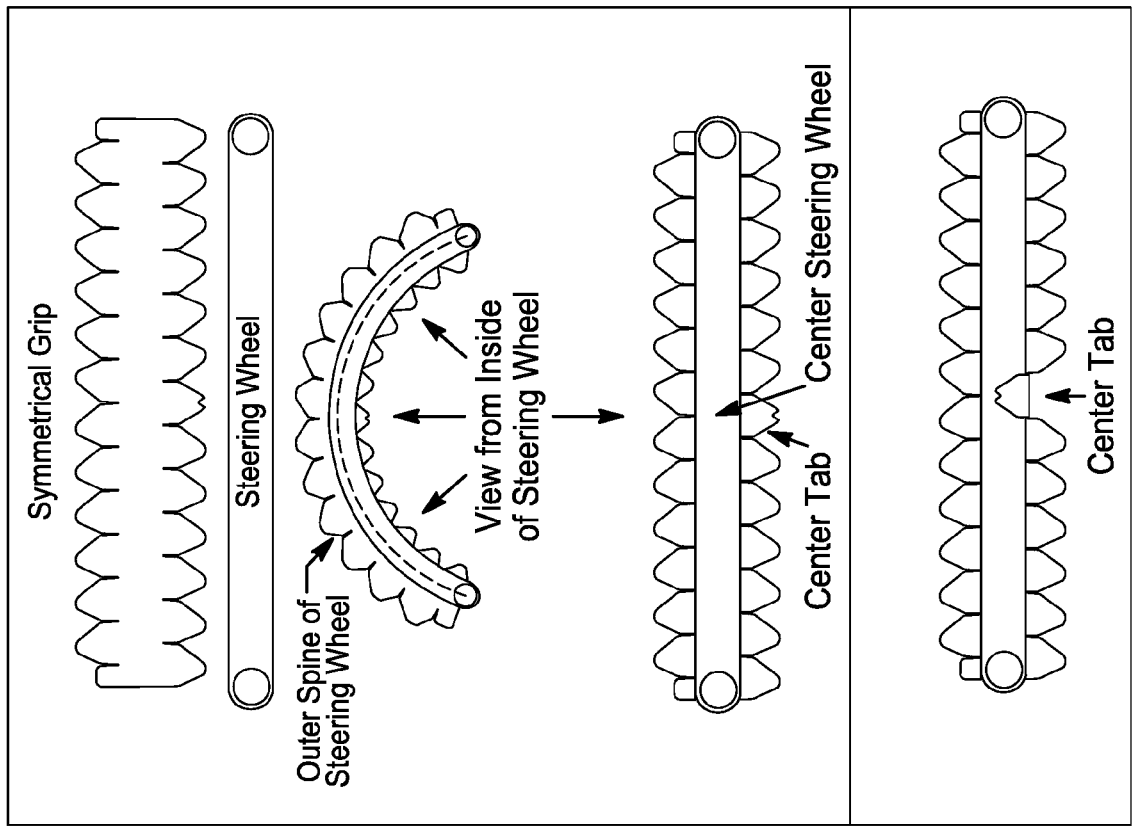
FIGS. 4a, 4b, and 4c depict installation stages beginning with a flat wrap in a free state as well as intermediate steps placing the wrap on a steering wheel in a mounted state.
Figure 4C:
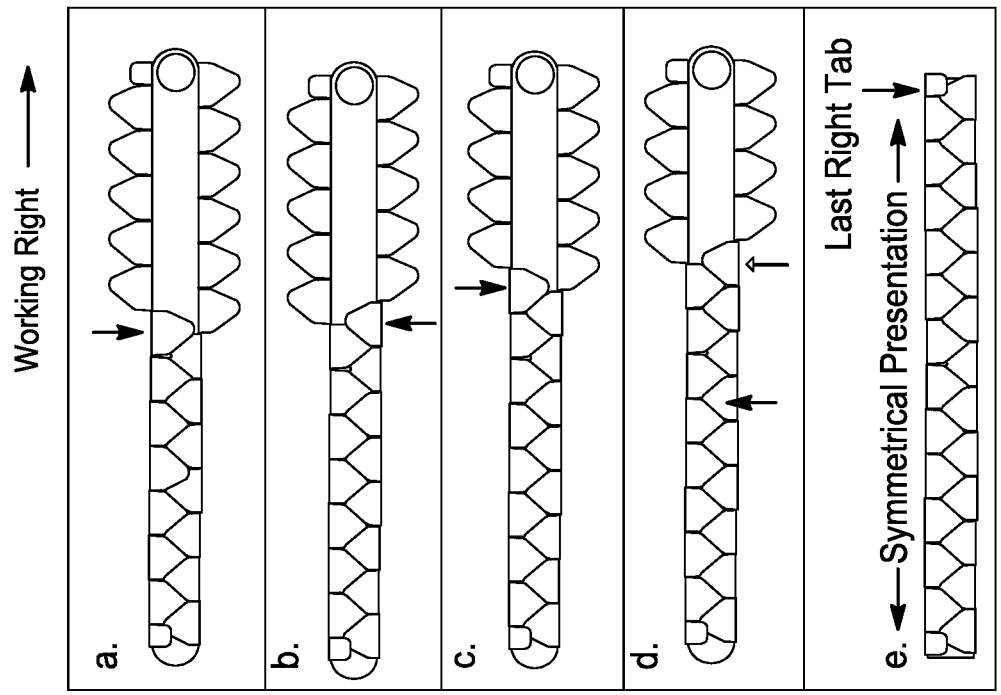
Figure 4B:
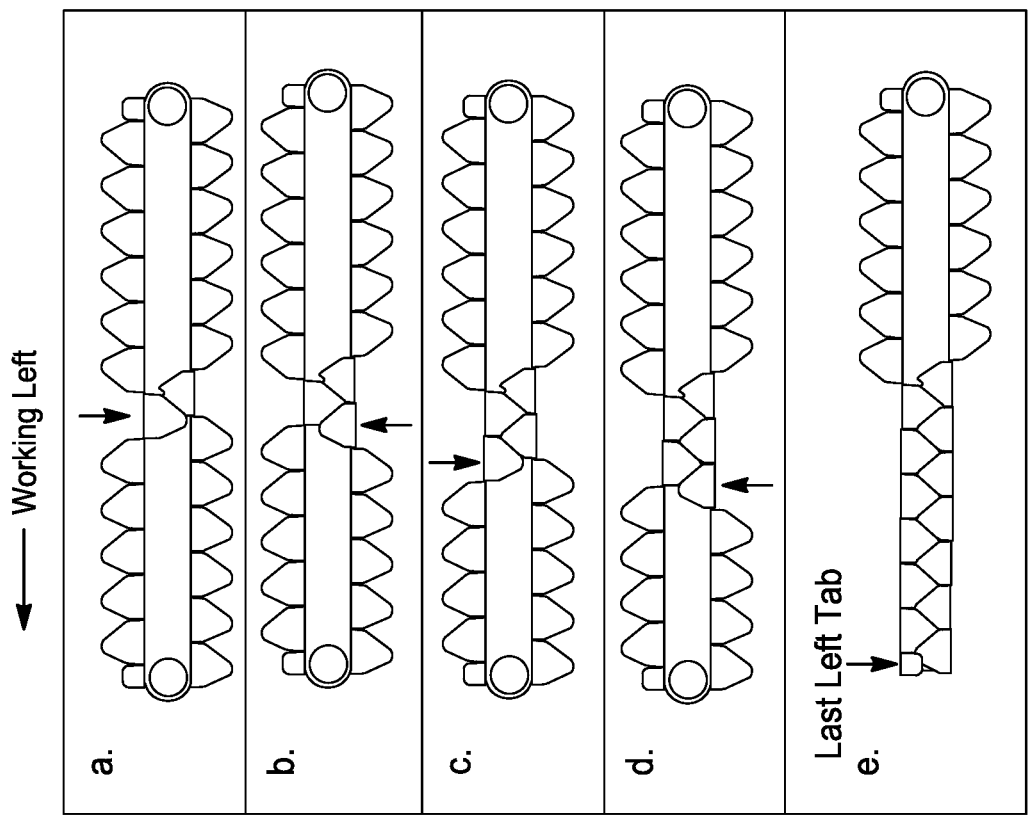

According to another advantage of the present invention, the invention can be installed starting the braid in the center of the desired object. For this example, we will discuss a steering wheel, although many other applications would be advantageous to display a symmetrical braid. Previous examples in this description, all show a linear braid from top to bottom. However, a slight change in the tab arrangement and design can result in a symmetrical braid beginning in the center of the invention and extending both to the left and right. Installation is to be achieved by peeling the adhesive backer off the material, leaving the adhesive exposed. Next, the spine of the invention is placed longitudinally against the steering wheel outer rim. Then, starting at the center, the user folds the middle tab, followed by the tab on the opposite side on the left or right, in a crisscross pattern until the complete half of the grip is laced, or braided into place on the left or right side, then performing the same task on the remaining side. Each tab is locked in by the one below leaving no loose ends to fail. The adhesive, in concert with the overlapping tabs makes for a desirable cover, which is resistant to failure with frictional use and is also symmetrical and pleasing to the eye for a centered presentation. This is achieved in design, by connecting two grips effectively, at their tops, to each other and changing the shape of the beginning tab discussed in FIG. 3 to a central tab. (See FIGS. 4a, 4b, 4c)

According to another advantage of the present invention, the cover leaves an orderly pattern which is pleasing to the eye showing skill, but not requiring it. The user braids or zips the tabs in place without thought to uniformity or consistency, because this is built into the invention design. The interlocking tabs are designed to nest together in relation to each other by design rather than tedious attention to detail on the part of the user. In the past this type of wrap is only achieved by great detail and skill applied to wrapping with a long strip. This invention infuses braiding technology into a simple, flat, compact sheet.

According to another advantage of the present invention, the interlocking tabs provide an extra layer of grip to the hand of the operator, allowing them to resist frictional slippage forces beyond that of the base material in a smooth, uncut application.

Other advantages, benefits, and features of the present invention will become apparent to those skilled in the art upon reading the detailed description of the invention and studying the drawings.

The invention claimed is:

1. An interlocking wrap for covering an outer surface of an object, comprising:
a one-piece unitary flexible panel, the panel including
a spine having a width and a longitudinally extending linear central axis,
a first tab and a third tab extending from the spine in a first laterally outward direction, wherein the first tab includes a first edge having a first end intersecting the spine and an opposite second end at a distal end of the first tab, at least a portion of the first edge extending at a non-right angle relative to the central axis, wherein the third tab is longitudinally spaced apart from the first tab and includes a first edge having a first end intersecting the spine and an opposite second end at a distal end of the third tab, at least a portion of the first edge of the third tab extending at a non-right angle relative to the central axis, the first edge of the first tab extending parallel to the fist edge of the third tab, and
a second tab and a fourth tab extending from the spine in a second laterally outward direction relative to the central axis, wherein the second direction is opposite the first direction, the second and fourth tabs being longitudinally spaced apart from one another having a gap therebetween, wherein the distal end of the first tab is longitudinally offset from the second and fourth tabs such that the distal end of the first tab is transversely aligned with the gap between the second and fourth tabs.

2. The interlocking wrap of claim 1, wherein the at least a portion of the first edge of the first tab extending at a non-right angle is curved.

3. The interlocking wrap of claim 1, wherein the at least a portion of the first edge of the first tab extending at a non-right angle is straight.

4. The interlocking wrap of claim 1, wherein the panel is shaped as a flat sheet.

5. The interlocking wrap of claim 1, wherein the panel includes one surface coated with an adhesive.

6. The interlocking wrap of claim 1, wherein the distal end of the first tab includes a triangular shape.

7. The interlocking wrap of claim 1, wherein the distal end of the first tab includes a straight edge.

8. The interlocking wrap of claim 1, wherein the spine is configured to engage the outer surface of the object such that the central axis is aligned with a longitudinal axis of the object, the first tab being configured to wrap around the object in a first circumferential direction, the second tab being configured to wrap around the object in a second and opposite circumferential direction and configured to at least partially overlap the first tab, wherein the third tab is configured to wrap around the object in the first circumferential direction and configured to at least partially overlap the second tab.

9. The interlocking wrap of claim 1, wherein the distal end of the first tab is configured to be covered by the second tab.

10. The interlocking wrap of claim 1, further comprising a terminal tab that is configured to remain uncovered by all other tabs.

\* \* \* \* \*